United States Patent
Wang

(10) Patent No.: US 12,309,341 B2
(45) Date of Patent: May 20, 2025

(54) WEARABLE DEVICE AND CONTROL METHOD THEREOF

(71) Applicant: HTC Corporation, Taoyuan (TW)

(72) Inventor: Yun-Ting Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 47 days.

(21) Appl. No.: 17/988,765

(22) Filed: Nov. 17, 2022

(65) Prior Publication Data

US 2023/0300310 A1    Sep. 21, 2023

Related U.S. Application Data

(60) Provisional application No. 63/321,110, filed on Mar. 18, 2022.

(51) Int. Cl.
| | |
|---|---|
| *H04N 13/117* | (2018.01) |
| *G02B 27/01* | (2006.01) |
| *G06V 20/20* | (2022.01) |

(52) U.S. Cl.
CPC ......... *H04N 13/117* (2018.05); *G02B 27/017* (2013.01); *G06V 20/20* (2022.01)

(58) Field of Classification Search
CPC ..... H04N 13/117; G06V 20/20; G02B 27/017
USPC .......................................................... 348/42
See application file for complete search history.

(56) References Cited

U.S. PATENT DOCUMENTS

| | | | |
|---|---|---|---|
| 9,558,584 B1 * | 1/2017 | Lo ......................... | G05D 1/0246 |
| 11,017,611 B1 * | 5/2021 | Mount .................... | G06V 20/20 |
| 11,442,591 B2 * | 9/2022 | Vathauer ................. | G06F 3/011 |
| 2016/0147408 A1 | 5/2016 | Bevis et al. | |
| 2017/0102778 A1 | 4/2017 | McGrath et al. | |
| 2019/0094981 A1 * | 3/2019 | Bradski ................ | H04N 21/414 |
| 2019/0324550 A1 | 10/2019 | Liao et al. | |
| 2020/0111256 A1 * | 4/2020 | Bleyer ..................... | G06F 3/011 |
| 2020/0126298 A1 | 4/2020 | Wei et al. | |
| 2020/0151965 A1 * | 5/2020 | Forbes ................... | G06T 19/006 |
| 2021/0118160 A1 | 4/2021 | Farås et al. | |
| 2021/0218947 A1 * | 7/2021 | Oh .......................... | G06T 9/001 |
| 2021/0319220 A1 | 10/2021 | Ichim et al. | |
| 2021/0347053 A1 * | 11/2021 | Lee ........................ | B25J 9/1653 |

(Continued)

FOREIGN PATENT DOCUMENTS

| | | |
|---|---|---|
| CN | 102226880 | 10/2011 |
| CN | 107145237 | 9/2017 |

(Continued)

OTHER PUBLICATIONS

"Office Action of Taiwan Counterpart Application", issued on Sep. 5, 2023, p. 1-p. 9.
"Office Action of Taiwan Counterpart Application", issued on Dec. 11, 2024, p. 1-p. 11.

*Primary Examiner* — Matthew David Kim
(74) *Attorney, Agent, or Firm* — JCIPRNET

(57) ABSTRACT

A wearable device is provided. The wearable device includes a processor. The processor is configured to: receive a user instruction, wherein the user instruction comprises a first virtual point and a second virtual point in a virtual world; obtain a first real point and a second real point in a real world respectively based on the first virtual point and the second virtual point according to an environment map around the wearable device; and determine a real distance between the first real point and the second real point.

20 Claims, 5 Drawing Sheets

(56) References Cited

U.S. PATENT DOCUMENTS

| | | | |
|---|---|---|---|
| 2022/0004253 A1* | 1/2022 | Cappello | G02B 27/017 |
| 2022/0130046 A1* | 4/2022 | Schreckenberg | G06V 10/25 |
| 2022/0165026 A1 | 5/2022 | Bieser et al. | |
| 2022/0261085 A1* | 8/2022 | Bazin | G06F 1/1686 |
| 2022/0350399 A1 | 11/2022 | Uberti | |
| 2022/0358715 A1 | 11/2022 | Tanner et al. | |
| 2023/0215090 A1* | 7/2023 | Ye | G06F 3/04815 |
| | | | 345/419 |
| 2023/0260223 A1* | 8/2023 | Chan | G01S 7/4808 |
| | | | 345/633 |
| 2023/0419513 A1* | 12/2023 | Dutta Choudhury | G06T 7/251 |
| 2024/0038084 A1* | 2/2024 | Marggraff | G02B 27/20 |
| 2024/0112399 A1* | 4/2024 | Ramani | G06V 40/28 |
| 2024/0350913 A1* | 10/2024 | Lu | A63F 13/5255 |

FOREIGN PATENT DOCUMENTS

| | | |
|---|---|---|
| CN | 107516336 | 12/2017 |
| CN | 108633307 | 10/2018 |
| CN | 110634182 | 12/2019 |
| CN | 111443802 | 7/2020 |
| CN | 115346054 | 11/2022 |
| TW | 201814592 | 4/2018 |
| TW | 202144983 | 12/2021 |
| TW | 202203156 | 1/2022 |
| WO | 2021123619 | 6/2021 |
| WO | 2021142451 | 7/2021 |

\* cited by examiner

WEARABLE DEVICE AND CONTROL METHOD THEREOF

CROSS-REFERENCE TO RELATED APPLICATION

This application claims the priority benefit of U.S. provisional application Ser. No. 63/321,110, filed on Mar. 18, 2022. The entirety of the above-mentioned patent application is hereby incorporated by reference herein and made a part of this specification.

BACKGROUND

Technical Field

The disclosure relates to a wearable device; particularly, the disclosure relates to a wearable device and a control method.

Description of Related Art

In order to bring an immersive experience to user, various technologies, such as augmented reality (AR) and virtual reality (VR), are constantly being developed. AR technology allows users to bring virtual elements in the virtual world to the real world. VR technology allows users to enter a whole new virtual world to experience a different life.

SUMMARY

The disclosure is direct to a wearable device and a control method, so as to improve the user experience.

In this disclosure, a wearable device is provided. The wearable device includes a processor. The processor is configured to: receive a user instruction, wherein the user instruction comprises a first virtual point and a second virtual point in a virtual world; obtain a first real point and a second real point in a real world respectively based on the first virtual point and the second virtual point according to an environment around the wearable device; and determine a real distance between the first real point and the second real point.

In this disclosure, a control method for a wearable device is provided. The control method includes: receiving a user instruction, wherein the user instruction comprises a first virtual point and a second virtual point in a virtual world; obtaining a first real point and a second real point in a real world respectively based on the first virtual point and the second virtual point according to an environment map around the wearable device; and determining a real distance between the first real point and the second real point.

Based on the above, according to the wearable device and the control method, a distance in the virtual may be measured and thereby improving the user experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
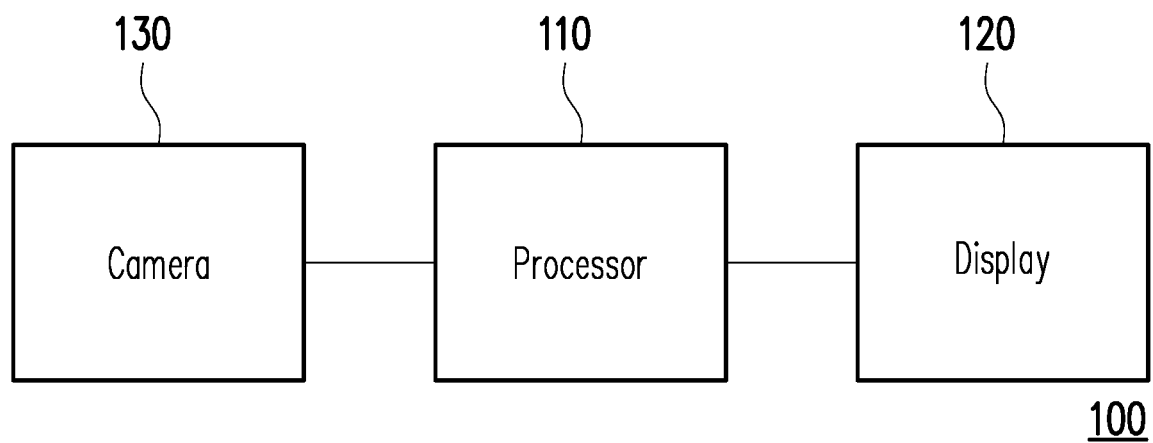
FIG. 1 is a schematic diagram of a wearable device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, various technologies, such as augmented reality (AR) and virtual reality (VR), are constantly being developed. AR technology allows users to bring virtual elements in the virtual world to the real world. VR technology allows users to enter a whole new virtual world to experience a different life.

On the other hand, users may utilize the virtual technology to create or imagine some objects in the real world before the objects were made in the real world, such as home decoration, art craft design, online shopping . . . etc. However, although users already see what the objects look like in the virtual worlds, the objects may look different in the real world due to mismatched sizes. Therefore, there is a need to provide the users detailed information (e.g., size, length, dimension) of the objects in the real world to let the users get "what you see is what you get" experience.

FIG. 1 is a schematic diagram of a wearable device according to an embodiment of the disclosure. With reference to FIG. 1, a wearable device 100 includes a processor 110. The processor 110 is configured to receive a user instruction (from a user). The user instruction includes a first virtual point and a second virtual point in a virtual world. The virtual world is displayed by the display 120. The processor 110 is configured to obtain a first real point and a second real point in a real world respectively based on the first virtual point and the second virtual point according to an environment map around the wearable device 100. The processor 110 is configured to determine a real distance between the first real point and the second real point. In this manner, the user is able to know the exact distance in the real world between the first virtual point and the second virtual point and thereby improving the user experience.

In one embodiment, the wearable device may further include a display 120. The display 120 is coupled to the processor 110 and is configured to display the real distance in the virtual world. That is, the user may directly know the size of an object in the virtual world without creating the object in the real world.

In one embodiment, the wearable device may further include a camera 130. The camera 130 is coupled to the processor 110 and is configured to capture a plurality of user photos of the user. The processor 110 is configured to obtain the user instruction from the plurality of user photos. For example, a hand of the user is included in the plurality of user photos. The processor 110 is configured to identify a hand pose of the hand of the user and determine the first virtual point and the second virtual point in the virtual world.

In one embodiment, the wearable device 100 includes, for example, a wearable head-mounted display (HMD), wearable glasses (e.g., AR/VR goggles), an electronic device, other similar devices, or a combination of these devices. However, the disclosure is not limited thereto.

In one embodiment, the processor 110 includes, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 110 may be achieved as multiple program codes. The program codes are stored in a memory, and executed by the processor 110. Alternatively, in an embodiment, each of the functions of the processor 110 may be achieved as one or more circuits. The disclosure does not limit the use of software or hardware to achieve the functions of the processor 110. In one embodiment, the processor 110 may be disposed on a wearable head-mounted display (HMD), wearable glasses (e.g., AR/YR goggles), an electronic device, other similar devices, or a combination of these devices. However, the disclosure is not limited thereto.

In one embodiment, the display 120 includes, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, the disclosure is not limited thereto.

In one embodiment, the camera 130 includes, for example, a complementary metal oxide semiconductor (CMOS) camera or a charge coupled device (CCD) camera. However, this disclosure is not limited thereto. In one embodiment, the camera 130 may be disposed on a wearable head-mounted display (HMD), wearable glasses (e.g., AR/VR goggles), an electronic device, other similar devices, or a combination of these devices. However, the disclosure is not limited thereto.

Figure 2A:
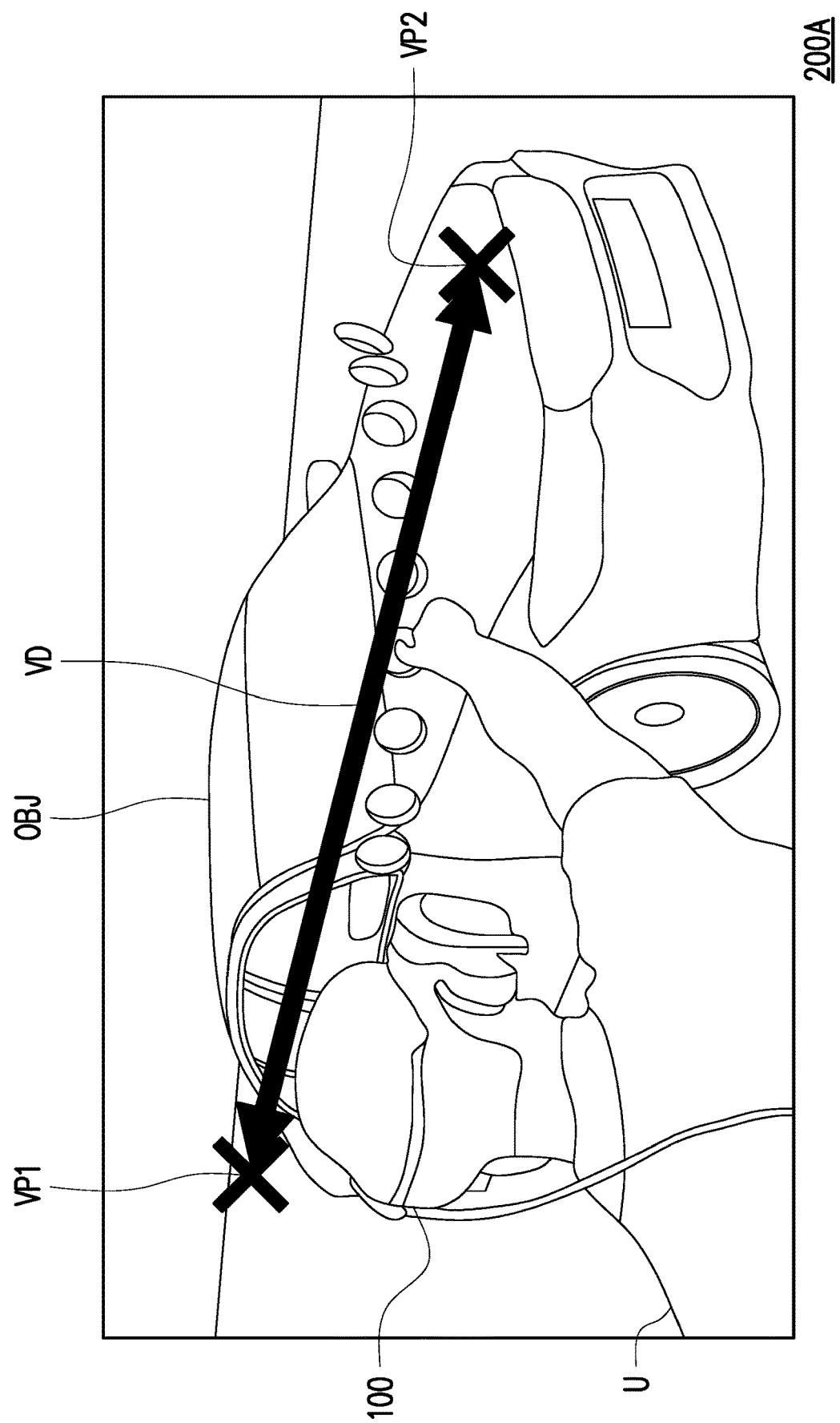
FIG. 2A is a schematic scenario of a wearable device according to an embodiment of the disclosure.
Figure 2B:
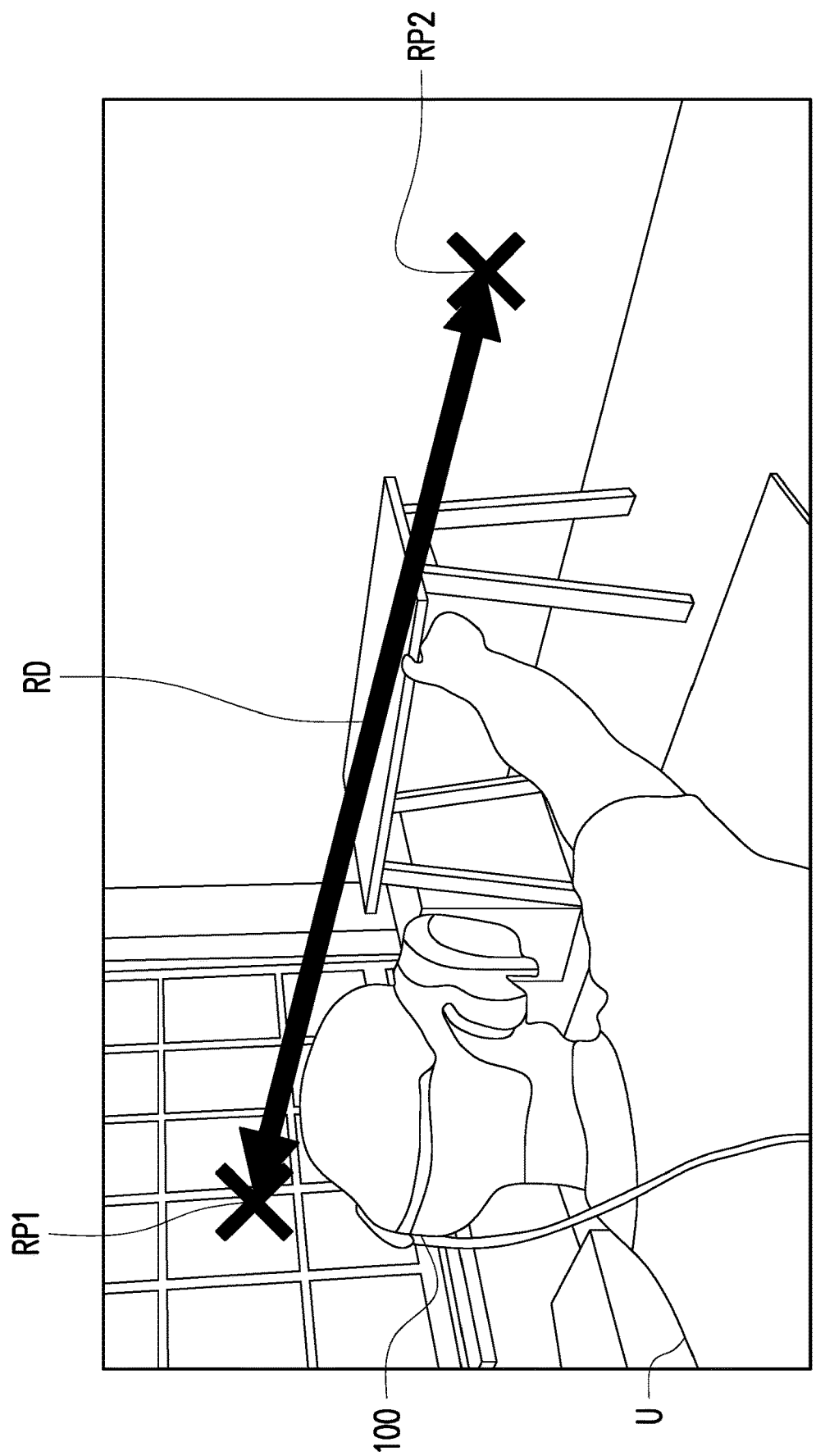
FIG. 2B is a schematic scenario of a wearable device according to an embodiment of the disclosure.

FIG. 2A is a schematic scenario of a wearable device according to an embodiment of the disclosure. FIG. 2B is a schematic scenario of a wearable device according to an embodiment of the disclosure. With reference to FIG. 1 to FIG. 2B, a scenario 200A of FIG. 2A shows what a user U see in a virtual world through the wearable device 100 and a scenario 200B of FIG. 2B shows what the user U with the wearable device 100 looks like in a real world.

Referring to FIG. 2A first, an object OBJ is disposed in the virtual world. After wearing the wearable device 100, the user may see the object OBJ in the virtual world. Further, the user U may point to places that the user wants to know the distance, length, or size. In one embodiment, the user U points to the first virtual point VP1 and the second virtual point VP2. Based on the first virtual point VP1 and the second virtual point VP2, a virtual distance VD may be determined and shown in the virtual world.

It is noted that, since the appearance (e.g., height, body shape, gender) of the virtual character of the user U in the virtual world might be different from the user U in the real world, the feeling of the user U in the virtual world may be also different from the feeling of the user U in the real world. In other words, the size of the object OBJ the user feels in the virtual world might be different from the actual size of the object OBJ in the real world.

Referring to FIG. 2B, while the user points to the first virtual point VP1 and the second virtual point VP2 in the virtual world, in the real world, the user U may correspondingly point to a first real point RP1 and a second real point RP2. Since the first real point RP1 and a second real point RP2 are real point in the real world, the real distance RD may be obtained or measured in multiple means. Based on the first real point RP1 and a second real point RP2, a real distance RD may be determined.

In one embodiment, for the purpose of estimating a playing area in the environment around the user U, an environment map around the user U may be established. It is noted that, while the user U is wearing the wearable device 100, the environment map may be either defined as an environment around the user U or an environment around the wearable device 100. The environment map may be established based on simultaneous localization and mapping (SLAM) algorithm. That is, the environment may be a SLAM map. Further, the environment map may include point cloud data. For example, the camera 130 may be configured to capture a plurality of environment photos. In addition, the processor 110 is configured to obtain a plurality of feature points from the plurality of environment photos. Then, the processor 110 is configured to obtain a plurality of map points based on the plurality of feature points. Based on the map points, a distance in the real world may be obtained.

In one embodiment, a tracker (e.g., an inertial measurement unit, IMU) may be disposed on the hand of the user U and a plurality of measurement values may be obtained from the tracker. Based on the plurality of measurement values, a displacement value and/or a rotation value of the hand of the user U may be obtained. That is, based on the plurality of measurement values, a displacement between real points in the real world may be obtained. Therefore, a distance in the real world may be obtained.

Figure 3:
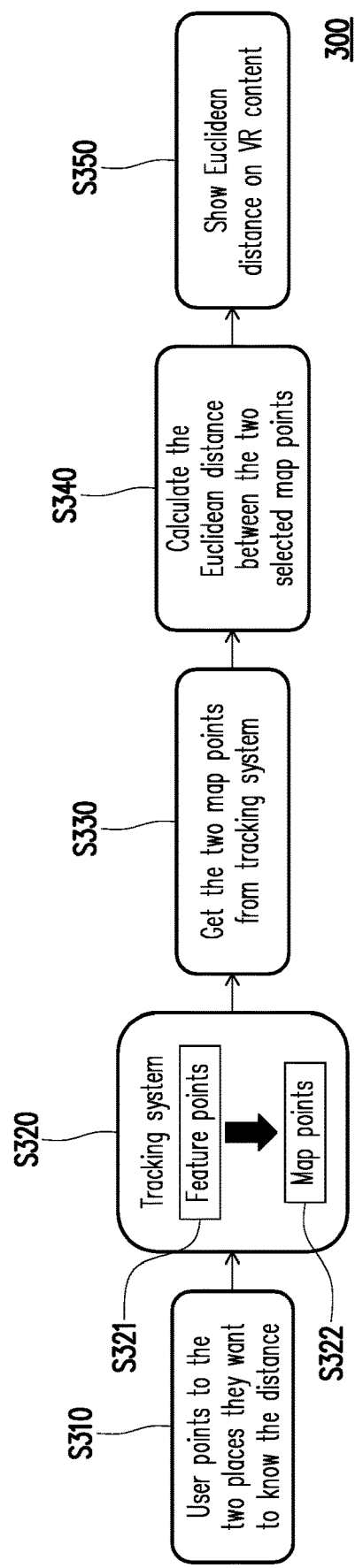
FIG. 3 is a schematic flowchart of a control method according to an embodiment of the disclosure.

FIG. 3 is a schematic flowchart of a control method according to an embodiment of the disclosure. With reference to FIG. 1 to FIG. 3, a control method 300 utilizing the SLAM algorithm is depicted. The control method 300 includes step S310, step S320, step S330, step S340, and step S350.

In the step S310, the user U may point to two places (e.g., first virtual point VP1 and second virtual point VP2) in the virtual world that they want to know the distance. In the step S320, a tracking system may track the pose of the user U. In one embodiment, the tracking system may be a stereo camera or a mono camera. The tracking system may obtain a plurality of user photos and a plurality of environment photos. Based on the environment photos, the processor 110 may obtain a plurality of feature points. Then, the processor 110 may obtain a plurality of map points to establish an environment map around the wearable device 100 based on the plurality of feature points.

In the step S330, the processor 110 may obtain a first map point and a second map point from the environment map. When the user U points to the first virtual point VP1 and the second virtual point VP2 in the virtual world, the tracking system may detect the user U actually points from the first real point RP1 and the second real point RP2. Specifically, when the user U points to the first virtual point VP1 in the virtual world, a plurality of first feature points around where the user U points in the real world are obtained by the tracking system. In additional, when the user U points to the second virtual point VP2 in the virtual world, a plurality of first feature points around where the user U points in the real world are obtained by the tracking system. Further, the processor 110 is configured to obtain a plurality of first feature points and a plurality of second feature points around the wearable device 100 and then obtain a first map point and a second map point based on the plurality of first feature points and the plurality of second feature points. That is, the first map point may indicate the first real point RP1 in the environment map, and the second map point may indicate the second real point RP2 in the environment map. In other words, based on the tracking system, the places the user U points in the virtual world may be converted to two real points in the real world.

In the step S340, since the first map point and the second map point are obtained, the Euclidean distance (e.g., real distance RD) between the two selected map points (i.e., first map point and second map point) may be calculated. In the step S350, the Euclidean distance may be display in the virtual world (e.g., VR content) by the display 120. In this manner, the user may directly know the size of an object in the virtual world without creating the object in the real world.

It is worth mentioned that, in addition to the measurement of a length or a distance, the control method 300 or the wearable device 100 is also able to measure an area or a volume. That, the user U may point to more than two points that related to an area or a volume that the user U would like to know.

In one embodiment, the user instruction may include the first virtual point, the second virtual point, and a third virtual point in the virtual world. In this case, the processor 110 is configured to obtain a third real point in the real world based on the third virtual point. Similarly, the processor 110 is configured to determine a real area formed by the first real point, the second real point, and the third real point based on the first virtual point, the second virtual point, and the third virtual point. In addition, the implementation details of measuring the area may be referred to the descriptions of FIG. 1 to FIG. 3 to obtain sufficient teachings, suggestions, and implementation embodiments, while the details are not redundantly described seriatim herein.

In one embodiment, the user instruction may include the first virtual point, the second virtual point, a third virtual point, and a fourth virtual point in the virtual world. In this case, the processor 110 is configured to obtain a third real point and a fourth real point in the real world based on the third virtual point and the fourth virtual point. Similarly, the processor 110 is configured to determine a real volume formed by the first real point, the second real point, the third real point, and the fourth real point based on the first virtual point, the second virtual point, the third virtual point, and the fourth virtual point. In addition, the implementation details of measuring the volume may be referred to the descriptions of FIG. 1 to FIG. 3 to obtain sufficient teachings, suggestions, and implementation embodiments, while the details are not redundantly described seriatim herein.

Figure 4:
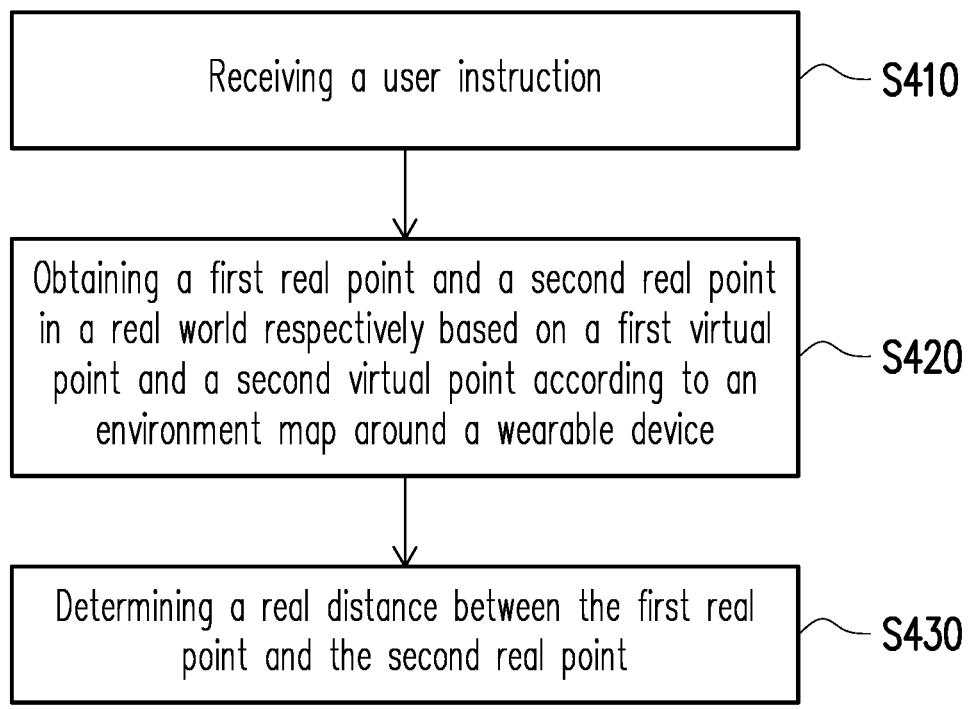
FIG. 4 is a schematic flowchart of a control method according to an embodiment of the disclosure.

FIG. 4 is a schematic flowchart of a control method according to an embodiment of the disclosure. With reference to FIG. 1 and FIG. 4, the control method 400 includes a step S410, a step S420, and a step S430.

In the step S410, the processor 110 is configured to obtain a user instruction. In the step S420, the processor 110 is configured to obtain a first real point RP1 and a second real point RP2 in a real world respectively based on a first virtual point VP1 and a second virtual point VP2 according to an environment map around the wearable device 100. In the step S430, the processor 110 is configured to determine a real distance RD between the first real point RP1 and the second real point RP2. In this manner, the user may directly know the size of an object in the virtual world without creating the object in the real world.

In addition, the implementation details of the control method 400 may be referred to the descriptions of FIG. 1 to FIG. 3 to obtain sufficient teachings, suggestions, and implementation embodiments, while the details are not redundantly described seriatim herein.

In summary, according to the wearable device and the control method of the disclosure, an object design by or view by a user in the virtual world may be measured. That is, the user is able to know the actual size of the object in the real world without literally creating the object in the real world and thereby improving the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A wearable device, comprising:
a processor, configured to:
establish an environment map of a real world around the wearable device based on simultaneous localization and mapping algorithm;
receive a user instruction, wherein the user instruction comprises a first virtual point and a second virtual point of a virtual object in a virtual world, wherein the virtual object is design by a user in the virtual world;

obtain a plurality of first feature points and a plurality of second feature points around the wearable device based the first virtual point and the second virtual point, wherein in response to the user pointing to the first virtual point in the virtual world, the plurality of first features points around where the user points in the real world are obtained, and in response to the user pointing to the second virtual point in the virtual world, the plurality of second features points around where the user points in the real world are obtained;

convert the first virtual point and the second virtual point to a first real point and a second real point in the real world respectively according to the environment map, the plurality of first feature points, and the plurality of second feature points; and determine a real distance between the first real point and the second real point.

2. The wearable device according to claim 1, further comprising:
a display, coupled to the processor and configured to display the real distance in the virtual world.

3. The wearable device according to claim 1, further comprising:
a camera, coupled to the processor and configured to capture a plurality of user photos of a user, wherein
the processor is configured to obtain the user instruction from the plurality of user photos.

4. The wearable device according to claim 1, wherein the processor is further configured to:
obtain the environment map around the wearable device, wherein the environment map comprises a first map point and a second map point, the first map point indicates the first real point in the environment map, and the second map point indicates the second real point in the environment map; and
determine the real distance based on the first map point and the second map point.

5. The wearable device according to claim 4, wherein the processor is further configured to:
obtain the first map point based on the plurality of first feature points; and
obtain the second map point based on the plurality of second feature points.

6. The wearable device according to claim 4, wherein the environment map is established based on simultaneous localization and mapping algorithm.

7. The wearable device according to claim 4, wherein the environment map comprises point cloud data.

8. The wearable device according to claim 1, wherein the processor is further configured to:
obtain a displacement from the first real point to the second real point; and
determine the real distance based on the displacement.

9. The wearable device according to claim 1, wherein the user instruction further comprises a third virtual point in the virtual world and the processor is further configured to:
obtain a third real point in the real world based on the third virtual point; and
determine a real area based on the first real point, the second real point, and the third real point.

10. The wearable device according to claim 1, wherein the user instruction further comprises a third virtual point and a fourth virtual in the virtual world and the processor is further configured to:
obtain a third real point in the real world based on the third virtual point;

obtain a fourth real point in the real world based on the fourth virtual point; and
determine a real volume based on the first real point, the second real point, the third real point, and the fourth real point.

11. A control method of a wearable device, comprising:
establishing an environment map of a real world around the wearable device based on simultaneous localization and mapping algorithm;
receiving a user instruction, wherein the user instruction comprises a first virtual point and a second virtual point of a virtual object in a virtual world, wherein the virtual object is design by a user in the virtual world;
obtaining a plurality of first feature points and a plurality of second feature points around the wearable device based the first virtual point and the second virtual point, wherein in response to the user pointing to the first virtual point in the virtual world, the plurality of first features points around where the user points in the real world are obtained, and in response to the user pointing to the second virtual point in the virtual world, the plurality of second features points around where the user points in the real world are obtained;
converting the first virtual point and the second virtual point to a first real point and a second real point in the real world respectively according to the environment map, the plurality of first feature points, and the plurality of second feature points; and
determining a real distance between the first real point and the second real point.

12. The control method according to claim 11, further comprising:
displaying the real distance in the virtual world.

13. The control method according to claim 11, further comprising:
obtaining a plurality of user photos of a user; and
obtaining the user instruction from the plurality of user photos.

14. The control method according to claim 11, further comprising:
obtaining the environment map around the wearable device, wherein the environment map comprises a first map point and a second map point, the first map point indicates the first real point in the environment map, and the second map point indicates the second real point in the environment map; and
determining the real distance based on the first map point and the second map point.

15. The control method according to claim 14, further comprising:
obtaining the first map point based on the plurality of first feature points; and
obtaining the second map point based on the plurality of second feature points.

16. The control method according to claim 14, wherein the environment map is established based on simultaneous localization and mapping algorithm.

17. The control method according to claim 14, wherein the environment map comprises point cloud data.

18. The control method according to claim 11, further comprising:
obtaining a displacement from the first real point to the second real point; and
determining the real distance based on the displacement.

19. The control method according to claim 11, wherein the user instruction further comprises a third virtual point in the virtual world and the control method further comprises:

obtaining a third real point in the real world based on the third virtual point; and determining a real area based on the first real point, the second real point, and the third real point.

20. The control method according to claim 11, wherein the user instruction further comprises a third virtual point and a fourth virtual point in the virtual world and the control method further comprises:

obtaining a third real point in the real world based on the third virtual point;

obtaining a fourth real point in the real world based on the fourth virtual point; and determining a real volume based on the first real point, the second real point, the third real point, and the fourth real point.

* * * * *